Patented July 8, 1924.

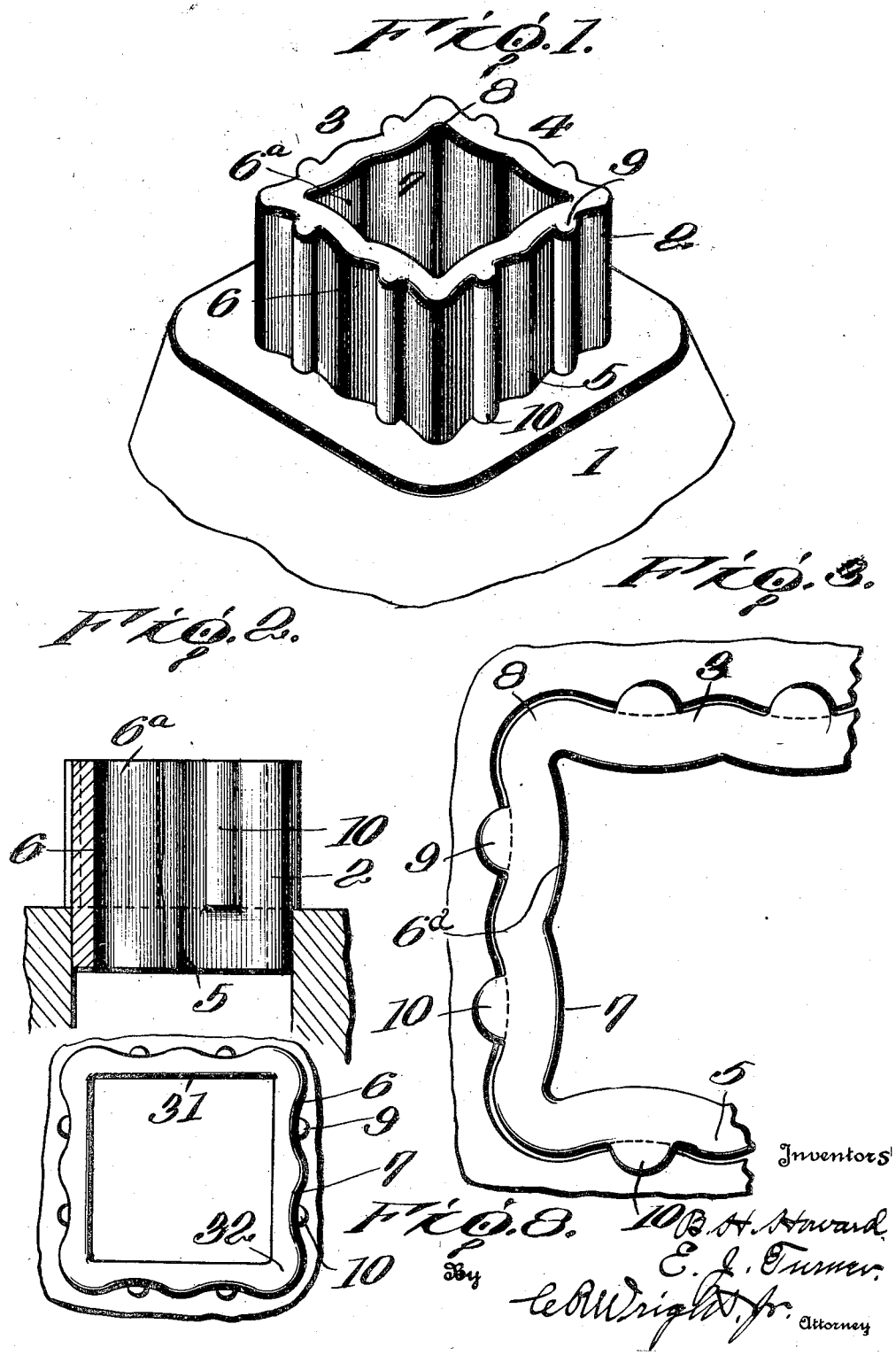

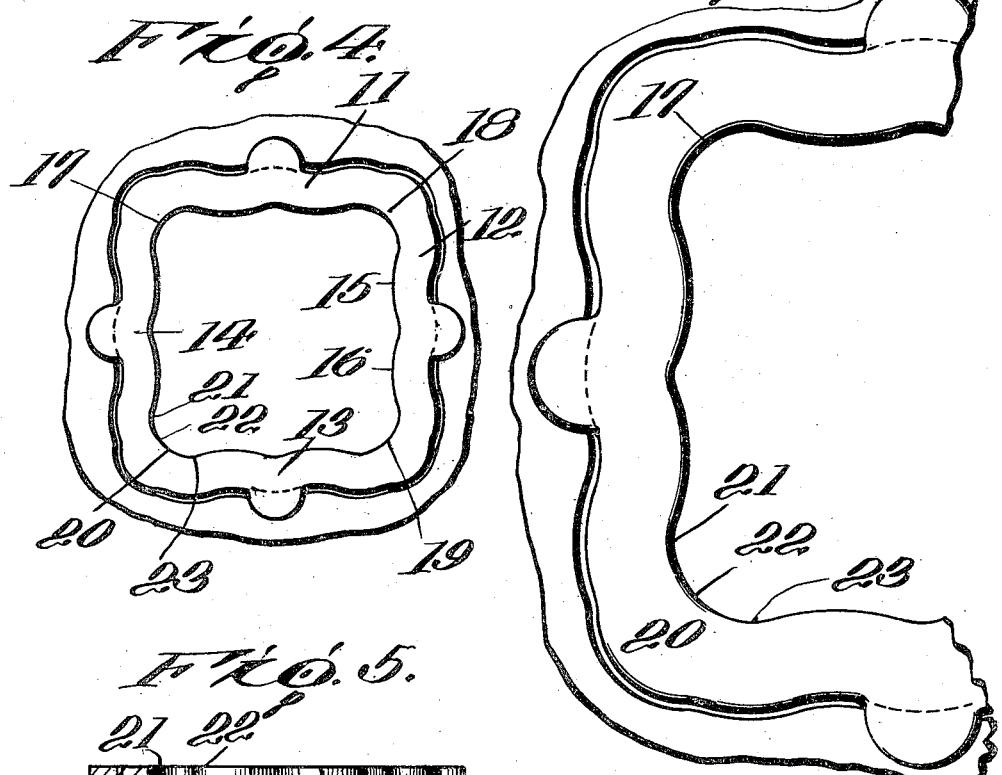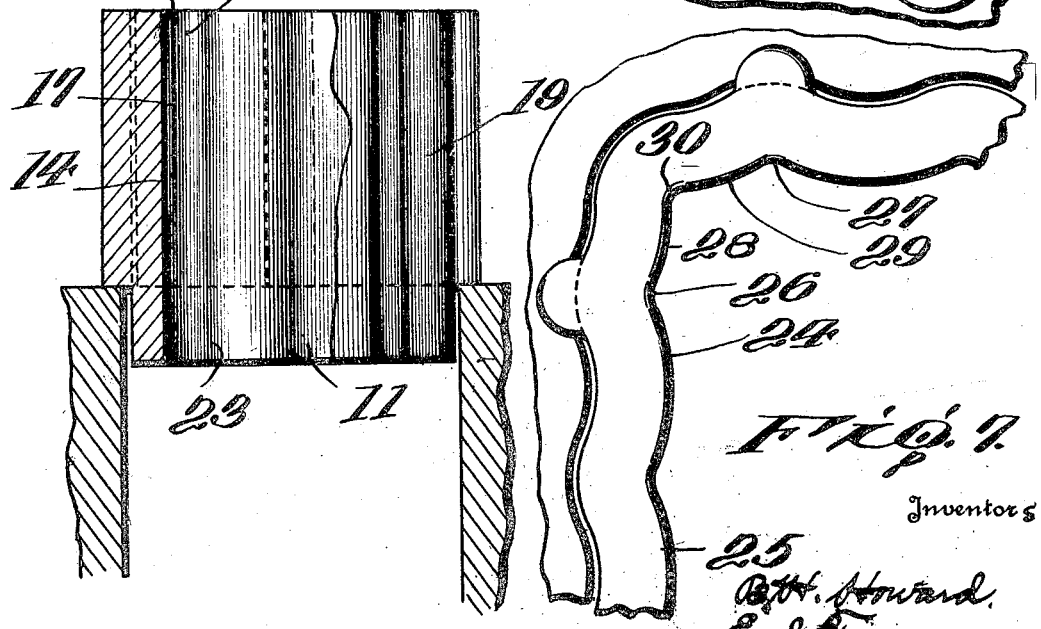

1,500,755

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed February 15, 1924. Serial No. 693,095.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful improvements in Feeders for Ingot Molds, of which the following is a specification.

Our invention relates to improvements in feeders for ingot molds.

The object of our invention is to provide a feeder for ingot molds adapted to be supported on the upper end of the mold and to closely fit the bore thereof and provide a feeder which will prevent the formation of what is known as "piping" and at the same time reduce segregation.

Another object of our invention is to provide a feeder having a large number of curved walls corresponding to that of the mold and which conforms in general to the shape of the article to be rolled from the ingot, whereby any imperfections in the walls of the ingot are more readily rolled out, and which also allows the scale on the outer wall of the ingot to more readily peel off during the rolling operation and thus produce a more perfect finished article.

A further object of our invention is to provide a feeder which can be readily and cheaply made by dies and supporting means simultaneously formed thereon.

In the accompanying drawings:

Figure 1 is a perspective view of a mold showing our improved feeder applied thereto.

Figure 2 is a vertical transverse sectional view of Figure 1.

Figure 3 is an enlarged top plan view of our improved feeder with a portion partly broken away.

Figure 4 is a top plan view of a modified form of feeder.

Figure 5 is a vertical transverse sectional view of Figure 4.

Figure 6 is an enlarged top plan view partly broken away of the form shown in Figure 4.

Figure 7 is a top plan view partly broken away of a still further modified form of our invention.

Figure 8 is a top plan view of Figure 1 showing straight interior walls with the corners slightly rounded.

Referring now to the drawings 1 represents the ingot mold and 2 the feeder. The feeder as shown in the drawings is of a square form, although it could be of a rectangular form of any dimension. The walls 3, 4, 5 and 6 of the feeder are each provided with two inwardly bellied portions 6ª and 7 connected at the corners by the outwardly bellied portion 8. The outer face of each side wall is provided with outwardly extending, integral ribs 9 and 10 which are semi-circular in cross section. While we have shown these ribs 9 and 10 arranged centrally, in respect to the bellied portions 6 and 7 it will be understood that they can be arranged at any desired point on the wall of the feeder and any desired number may be used. But it has been found better that at least two ribs be arranged on each side.

In the modification shown in Figure 4 each of the side walls 11, 12, 13 and 14 of the feeder is provided with the two inwardly bellied portions 15 and 16 connected at the corners by the outwardly bellied portions 17, 18, 19 and 20. These outwardly bellied portions, at the corners are struck on the arc of three circles as indicated at 21, 22 and 23 whereby as heretofore stated a greater number of faces are produced to accomplish the result heretofore set forth.

In the modification shown in Figure 7 the two inwardly bellied portions 24 and 25 are arranged on each of the four walls of the feeder and are connected at each corner by the two outwardly bellied portions 26 and 27 which terminate in the inwardly bellied portions 28 and 29 connected by the outwardly curved portions 30. The curves of the bellied portions are each arranged on a different arc of a circle whereby a greater number of faces are produced.

In Figure 8 we have shown the form of feeder shown in Figure 1 showing a straight interior wall 31 slightly rounded at the corners as indicated at 32.

Having thus fully described our invention what we claim is:—

1. A feeder for ingot molds comprising a body portion having a series of walls, each of said walls having two inwardly bellied portions.

2. A feeder for ingot molds comprising a body portion having a series of walls, each of said walls having two inwardly bellied portions connected by outwardly bellied portions.

3. A feeder for ingot molds comprising a body portion having a series of walls, each of said walls having two inwardly bellied portions and the inwardly bellied portions of one wall connected to those of the other wall by outwardly bellied portions.

4. A feeder for ingot molds comprising a body portion having a series of walls, each wall having two inwardly bellied portions connected by an outwardly bellied portion arranged in the arc of three circles.

5. A feeder for ingot molds comprising a body portion having a series of walls, each wall having two inwardly bellied portions the inwardly bellied portions of one wall connected to the inwardly bellied portions of the adjoining wall by outwardly bellied portions arranged in the arc of three circles.

6. A feeder for ingot molds comprising a rectangular body portion, each of the four walls having two inwardly bellied portions and outwardly bellied portions at the corners, connecting the inwardly bellied portions of the said walls.

7. A feeder for ingot molds comprising a series of walls, each wall having two inwardly bellied portions, the inwardly bellied portions of the two side walls connected by two outwardly bellied portions terminating in two inwardly bellied portions connected by a central outwardly bellied portion.

8. A feeder for ingot molds comprising a body portion having a series of walls, the outer face of each wall having two inwardly bellied portions and having a straight interior wall with slightly rounded corners.

In testimony whereof we affix our signatures.

BLOOMFIELD H. HOWARD.
ERNEST J. TURNER.